United States Patent [19]

Phillips, II

[11] Patent Number: 5,256,019

[45] Date of Patent: Oct. 26, 1993

[54] WASHERLESS SELF-CAPTIVATING SCREW

[75] Inventor: Ronald W. Phillips, II, Sellersville, Pa.

[73] Assignee: Penn Engineering & Manufacturing Corp., Danboro, Pa.

[21] Appl. No.: 980,728

[22] Filed: Nov. 24, 1992

[51] Int. Cl.⁵ .................. F16B 23/00; F16B 35/06; F16B 39/282; B23P 11/02
[52] U.S. Cl. .................. 411/187; 411/107; 411/399; 411/533; 29/437; 29/525.1
[58] Field of Search ............... 411/107, 180, 181, 187, 411/399, 533, 968, 999; 29/437, 525.1

[56] References Cited

U.S. PATENT DOCUMENTS

| | | | |
|---|---|---|---|
| 1,547,162 | 7/1925 | Bohlman | 411/533 |
| 1,773,410 | 8/1930 | Selah | 411/999 |
| 1,854,730 | 4/1932 | Bell | 411/999 |
| 1,946,063 | 2/1934 | Dodge | 411/180 X |
| 3,186,284 | 6/1965 | Bennett | 411/180 X |
| 3,465,803 | 9/1969 | Ernest et al. | 411/968 |
| 3,770,037 | 11/1973 | Ernest | 411/968 |

Primary Examiner—Neill R. Wilson
Attorney, Agent, or Firm—Gregory J. Gore

[57] ABSTRACT

A self-captivating screw becomes captive in a metal sheet, yet is freely rotatable after a simple pressing of the two parts. The screw is applied to the sheet by pressing against an anvil having a circular cavity in alignment with the panel aperture. The screw has an elongate shank with a head at one end and a threaded portion at the opposite end. The head and threaded portion are greater in diameter than the shank. The screw includes a displacer collar just beneath the head which, under pressure, deforms the metal sheet causing the cold flow of panel metal inward about the screw shank without gripping it tightly. The anvil cavity has a diameter greater than the major diameter of the screw threads, but less than the diameter of either the displacer collar or the minor diameter of the threads.

8 Claims, 2 Drawing Sheets

FIG. 4
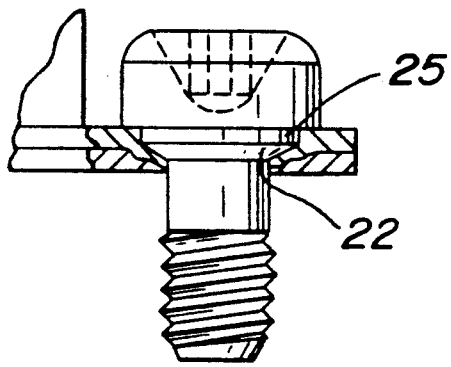
FIG. 5a
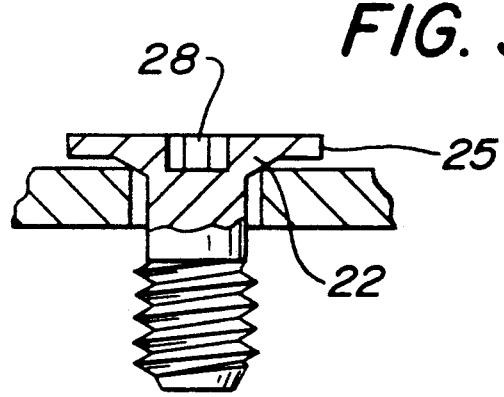
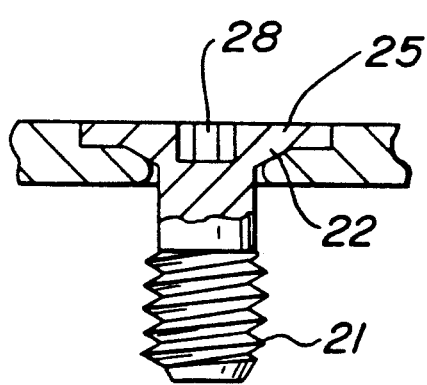
FIG. 5b

WASHERLESS SELF-CAPTIVATING SCREW

FIELD OF THE INVENTION

The invention relates to a process and a product for attaching a rotatable screw to a plate-shaped workpiece, especially to a metal sheet. It also relates to the screw itself; in particular, a screw to be fastened to a plate-shaped workpiece that deforms the workpiece to capture the screw.

BACKGROUND OF THE INVENTION AND PRIOR ART

There are many applications in the mechanical arts where a screw is required to be captively retained in a sheet metal panel, yet be freely rotatable so that the screw may engage a second part. Through rotation of the screw, the second part becomes secured to the sheet metal. Prior art fastening systems which meet this requirement utilize a deformable washer or similar additional structure positioned behind the sheet metal panel. The washer constricts under compression to capture a small diameter shank of the screw which lies between the head of the screw and a threaded end portion. The closest prior art of which the applicant is aware are U.S. Pat. No. 293,295 issued to F. H. Agnew, entitled "Nut Lock"; U.S. Pat. No. 2,470,927 issued to W. C. Hale, Jr., entitled "Fastening Means"; U.S. Pat. No. 3,118,718 issued to G. Babey, entitled "Electrical Wiring Device"; U.S. Pat. No. 3,244,212 issued to J. K. Barry, entitled "Retractable Threaded Fastener"; and U.S. Pat. No. 3,426,819 issued to R. Estes et al, entitled "Bolt with Deformable Washer".

All of these prior art fastening systems require the use of a separate deformable part, usually a washer. To reduce the number of parts in a given sheet metal assembly, there is therefore a need in the art for a fastening system which can captively retain a screw in a sheet metal workpiece without requiring a separate deformable part.

SUMMARY OF THE INVENTION

In order to fulfill the needs in the fastening arts described above, the present invention has been devised. A self-captivating screw and press anvil have been constructed so that when pressed into a sheet metal workpiece, the screw becomes captive in the metal sheet, yet is freely rotatable. This novel design and process does not require the use of additional parts, such as deformable washers to capture the screw.

The screw comprises an elongate shank with a head at one end and a threaded portion at the opposite end. The head and the threaded portion are greater in diameter than the shank. The panel aperture is sized smaller than the screw head, but greater in diameter than the threaded portion so that the screw can be easily placed in the sheet prior to pressing. The screw includes a displacer collar just beneath the head which under pressure, deforms the metal sheet causing the cold flow of metal inward toward the center of the aperture. The screw further may include a frustroconical centering ramp, convergent toward the threaded end of the screw. The centering ramp properly locates the screw in the aperture and has a major diameter less than the displacer collar.

A critical part of the invention is the press anvil which supports the back side of the panel during installation of a screw. The anvil includes a circular cavity in alignment with the panel aperture, which is dimensioned so that it has a diameter greater than the major diameter of the screw threads, but is less than the diameter of the displacer collar. With these dimensions, the anvil causes the flow of metal during pressing to move inward and surround the shank of the screw. The exact dimensions of the relative proportions described above are varied according to the materials and the pressing force employed, which are selected to loosely capture the screw in the panel.

More specifically, the applicant has invented a new screw design and a method of captivating a screw in a panel comprising the following steps. A screw is first placed into a panel aperture. The screw comprises an elongate shank with a head at one end and a threaded portion at the opposite end. The head and threaded portion are greater in diameter than the shank. A displacer collar is directly beneath the head, the collar being smaller in diameter than the head. The head of the screw is pressed into the panel, while supporting the back side of the panel with an anvil which has a circular recess located in alignment with the panel aperture to receive the end of the screw during pressing. The anvil recess has a diameter greater than the thread, but less than the diameter of the displacer collar, whereby the pressing causes the cold flow of metal around the panel aperture to move inward about the shank to loosely capture the screw in the panel.

It is therefore an object of the present invention to create a self-captivating screw which requires only a simple, drilled or punched circular hole in the loosely attached panel. Another object of the present invention is to create a self-captivating screw which can be used in materials of unlimited thickness and which has a high push-out resistance after installation. It is yet a further object of the present invention to create a self-captivating screw which drops freely into the panel prior to installation.

The present invention achieves these objectives and is a simplified fastening system which provides economies of material and labor not achievable by the prior art. Other objects and advantages of the present invention will become readily apparent to those of skill in the art from the following figures of drawing and description of the preferred embodiment.

BRIEF DESCRIPTION OF THE DRAWINGS

FIG. 4 is a side view of an alternate embodiment of the present invention, which includes a centering ramp.

FIGS. 5a and 5b are side views of an alternate embodiment of the present invention, both before and after press installation showing a screw without a head.

DESCRIPTION OF THE PREFERRED EMBODIMENT

Figure 1:
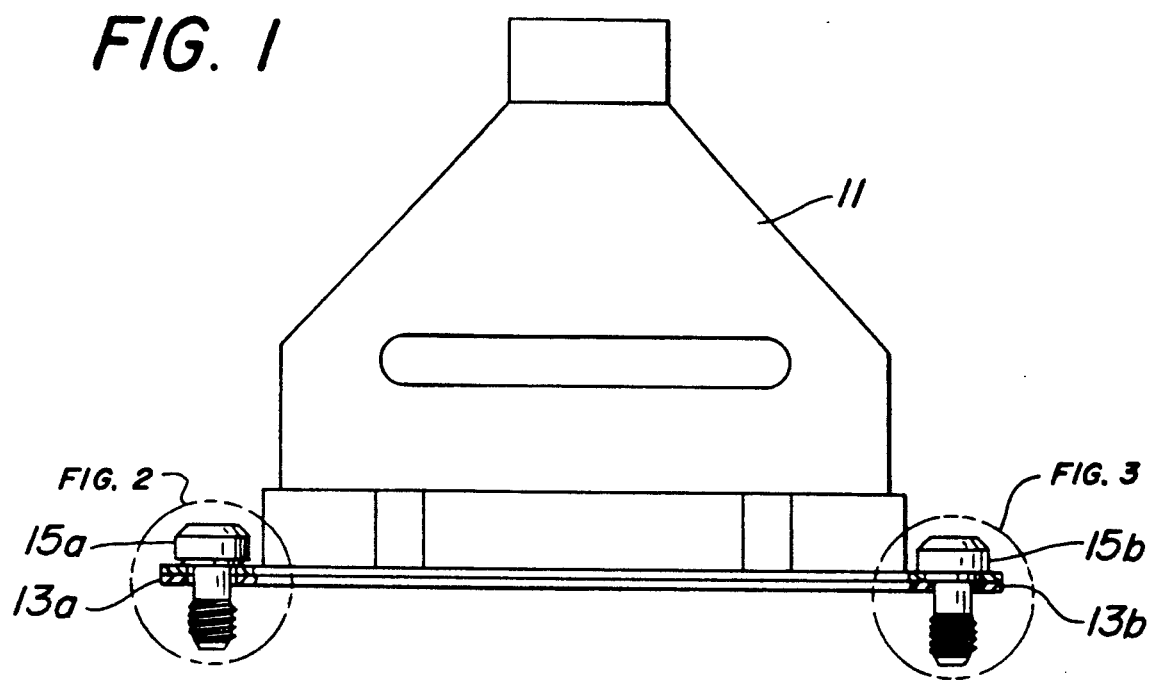
FIG. 1 is a top view, partially sectioned, of an electrical connector into which the present invention has been installed.

Referring now to FIG. 1, the present invention is shown installed into the face plate of electrical connector 11 through sheet metal mounting ears 13a and 13b. Screw 15a is shown loosely fitted into the connector, and screw 15b is shown in its captive condition after pressing.

Figure 2:
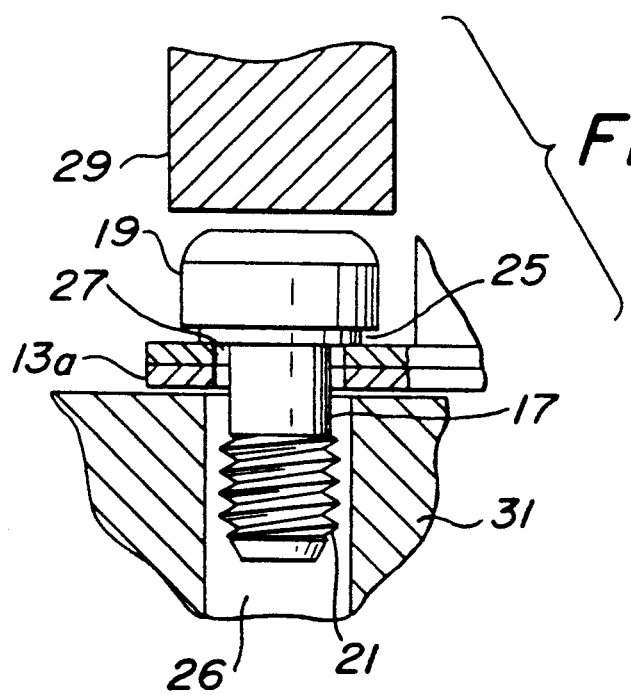
FIG. 2 is an enlargement of a portion of FIG. 1 showing the present invention before press installation.

Referring now to FIG. 2, greater detail of the structure of the present invention is shown. Screw 13a is loosely inserted into sheet metal panels 13a. The screw includes an elongate shank 17 with a head 19 at one end, and a threaded portion 21 at the opposite end. The shank area represents the smallest diameter of the screw. The screw further includes displacer collar 25 which is located directly beneath the head and which is greater in diameter than aperture 27 in the panel, but of less diameter than head 19. The major diameter of the threaded portion 21 is less than the aperture 27 so that the screw may be dropped into the position shown in this figure with zero insertion force.

FIG. 2 also shows details of the installation ram 29 and supporting anvil 31 just prior to pressing. The anvil includes circular cavity 26 which receives the end of the screw protruding from back side of the panel. The diameter of the anvil cavity is greater than the diameter of the aperture 27 in the panel, yet less than the diameter of the displacer collar 25.

Figure 3:
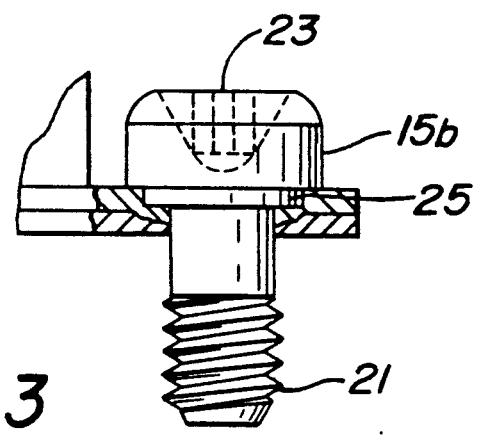
FIG. 3. is an enlargement of a portion of FIG. 1 showing the present invention after press installation.

Referring now to FIG. 3, screw 15b, identical to the screw of FIG. 2 is shown pressed by a ram into the connector sheet metal mounting ear 13b. As shown in this figure, the head includes a Phillips-type drive 23, but it will be readily understood in the fastening arts that other drives may be substituted. As shown in this figure, the displacer collar has embedded into the metal panel by the force of the ram and has caused the deformation of the sheet metal, contracting the aperture about the shank of the screw. The larger diameter head acts as a stop so that the width of the collar determines the distance the screw is pressed into the sheet.

The screw in FIG. 3 is dimensioned such that the minor diameter of the threaded portion 21 is greater than the constricted diameter of the panel aperture. With these dimensions, the screw is loosely captured in the panel, yet the push-out force is increased and backout of the screw is prevented. All dimensions and pressing force are selected by trial in accordance with the material used so that in its assembled condition shown in this figure, screw 15b is freely rotatable, but the shank remains axially captive in the aperture of the sheet metal.

FIG. 4 depicts an alternate embodiment of the present invention, wherein the screw further includes a frustoconical centering ramp 22 extending from the bottom of the displacer collar 25 which terminates along the outer circumference of the shank. This ramp causes the screw to become selfcentering when initially placed into the panel aperture and during pressing.

FIGS. 5a and 5b depict yet another embodiment of the present invention, wherein the screw is similar to that shown in FIG. 4, but with a larger diameter displacer collar and without a head. The screw can be turned by socket 28. In its installed condition shown in FIG. 5b, the top of the displacer collar of this embodiment is flush with the outer surface of the panel after pressing. In this embodiment, the centering ramp has a major diameter less than the diameter of the displacer collar. It can also more clearly be seen in FIG. 5b that the constricted aperture is less than the minimum diameter of the threaded portion 21. Installation is achieved utilizing the ram and anvil shown in FIG. 2.

It will be apparent from the description of the preferred embodiment to those of skill in the mechanical arts that a self-captivating screw has been created which is washerless, yet provides the following additional advantages: (a) only a simple, drilled or punched hole is required; (b) the screw may be inserted into sheet material of unlimited thickness; (c) the screw drops freely into the panel prior to pressing and is self-centering; and (d) the assembled fastener is resistant to high push-out forces.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A rotatable, captive screw loosely fitted into a sheet metal panel, comprising:
   a planar sheet metal panel having a simple circular aperture formed there;
   a screw fitted into said aperture, said screw comprising an elongate shank with a head at one end and a threaded portion at the opposite end, said head and said threaded portion being greater in diameter than said shank;
   said aperture being smaller than said head, but greater in diameter than said threaded portion of said screw;
   a displacer collar located directly beneath said head, said collar being smaller in diameter than said head and having a portion forming a shoulder perpendicular to the axis of said screw; and
   said screw being loosely captive within said panel without the aid of other parts by forcibly embedding said collar into said panel supported by an anvil having a circular recess less than the diameter of the displacer collar, thereby deformably constricting said panel about said shank.

2. The captive screw and sheet metal panel of claim 1, further including a centering ramp directly beneath said collar, said ramp having a major diameter greater than said aperture.

3. The screw and panel of claim 2, wherein the minor diameter of the threaded portion is greater than the constricted diameter of the panel aperture.

4. The screw and panel of claim 3, wherein said panel is the face plate of an electrical connector.

5. The method of captivating a screw in a panel, comprising the steps of:
   placing a screw into a simple circular aperture in a panel, said screw comprising an elongate shank with a head at one end and a threaded portion at the opposite end, said head and said threaded portion being greater in diameter than said shank, and a displacer collar located directly beneath said head, said collar being smaller in diameter than said head; and
   pressing the head of said screw into the panel while supporting the back side of the panel with an anvil having a circular recess located in alignment with said panel aperture to receive the end of the screw during pressing, said anvil recess having a diameter greater than said thread, but less than the diameter of the displacer collar, whereby said pressing causes the cold flow of metal around the panel aperture to move inward about the shank to loosely capture the screw in the panel.

6. The method of claim 5, wherein said screw includes a centering ramp located directly beneath said collar, said ramp having a major diameter greater than said aperture.

7. The method of claim 6, wherein the minor diameter of the threaded portion of said screw is greater than the constricted diameter of the panel aperture.

8. The method of claim 7, wherein said panel is the face plate of an electrical connector.

* * * * *